(12) United States Patent
Uozumi et al.

(10) Patent No.: US 11,213,921 B2
(45) Date of Patent: Jan. 4, 2022

(54) DEVICE FOR MANUFACTURING PLATE SOLDER AND METHOD FOR MANUFACTURING PLATE SOLDER

(71) Applicant: Mitsubishi Electric Corporation, Tokyo (JP)

(72) Inventors: Shuji Uozumi, Tokyo (JP); Kazuhiko Sakutani, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 266 days.

(21) Appl. No.: 16/475,938

(22) PCT Filed: Mar. 16, 2017

(86) PCT No.: PCT/JP2017/010755
§ 371 (c)(1),
(2) Date: Jul. 3, 2019

(87) PCT Pub. No.: WO2018/167929
PCT Pub. Date: Sep. 20, 2018

(65) Prior Publication Data
US 2019/0389013 A1 Dec. 26, 2019

(51) Int. Cl.
*B23K 35/00* (2006.01)
*B23K 1/00* (2006.01)
(Continued)

(52) U.S. Cl.
CPC .............. *B23K 35/40* (2013.01); *B23K 3/00* (2013.01); *B23K 3/06* (2013.01); *B23K 3/0623* (2013.01);
(Continued)

(58) Field of Classification Search
CPC ....... H01L 2224/48; H01L 2224/85207; H01L 2224/85205; H01L 24/78; H01L 24/85;
(Continued)

(56) References Cited

U.S. PATENT DOCUMENTS 4,596,352 A * 6/1986 Knapp ................ B23K 20/106
228/1.1
5,941,443 A * 8/1999 Steiner ................ B23K 20/10
228/1.1
(Continued)

FOREIGN PATENT DOCUMENTS

JP S60-38228 B2 8/1985
JP S61-108467 A 5/1986
(Continued)

OTHER PUBLICATIONS

An Office Action; "Notification of Reasons for Refusal," mailed by the Japanese Patent Office dated Aug. 25, 2020, which corresponds to Japanese Patent Application No. 2019-505633 and is related to U.S. Appl. No. 16/475,938 with English language translation.
(Continued)

*Primary Examiner* — Erin B Saad
(74) *Attorney, Agent, or Firm* — Studebaker & Brackett PC (57) ABSTRACT

A device for manufacturing a plate solder according to the present invention includes a reel on which a thread solder is wound; a cutter that cuts the thread solder, provided between the reel and an end part of the thread solder extending from the reel; an aggregating part that aggregates a plurality of cut thread solders such that the plurality of thread solders are in contact with one another; and a roller that rolls the plurality of aggregated thread solders and pressure bonds them to one another to form a plate solder.

6 Claims, 8 Drawing Sheets

(51) Int. Cl.
  B23K 3/00      (2006.01)
  B23K 35/40     (2006.01)
  B23K 35/24     (2006.01)
  B23K 20/02     (2006.01)
  B23K 3/06      (2006.01)
  B23K 20/04     (2006.01)
  B23K 20/00     (2006.01)
  B23K 35/02     (2006.01)
  B23K 101/40    (2006.01)

(52) U.S. Cl.
  CPC .............. *B23K 20/00* (2013.01); *B23K 20/02* (2013.01); *B23K 20/021* (2013.01); *B23K 20/04* (2013.01); *B23K 35/0233* (2013.01); *B23K 35/24* (2013.01); *B23K 2101/40* (2018.08)

(58) Field of Classification Search
  CPC ... H01L 2224/4846; H01L 2224/85203; H01L 24/48; B23K 20/10; B23K 20/106; B23K 2101/32; B23K 2101/38; B23K 20/004
  See application file for complete search history.

(56) References Cited

U.S. PATENT DOCUMENTS

| | | | | |
|---|---|---|---|---|
| 6,386,426 | B1* | 5/2002 | Tadauchi | B23K 35/0227 228/117 |
| 6,719,595 | B1* | 4/2004 | Welcker | H01R 4/023 439/755 |
| 8,047,420 | B2* | 11/2011 | Stroh | H01R 43/0207 228/110.1 |
| 8,931,685 | B2* | 1/2015 | Kataoka | H01R 4/021 228/110.1 |
| 10,373,736 | B2* | 8/2019 | Nakai | H01B 7/17 |
| 2002/0000459 | A1* | 1/2002 | Wnek | B23K 20/10 228/1.1 |
| 2006/0283912 | A1* | 12/2006 | Eberach | H01R 43/0207 228/101 |
| 2008/0032569 | A1* | 2/2008 | Steiner | B23K 20/10 439/874 |
| 2019/0193212 | A1* | 6/2019 | Uozumi | B23K 35/0233 |
| 2019/0389013 | A1* | 12/2019 | Uozumi | B23K 35/40 |

FOREIGN PATENT DOCUMENTS

| | | |
|---|---|---|
| JP | S63-119997 A | 5/1988 |
| JP | H5-160562 A | 6/1993 |
| JP | H6-132645 A | 5/1994 |
| JP | H08-118074 A | 5/1996 |
| JP | 2002-210552 A | 7/2002 |

OTHER PUBLICATIONS

An Office Action mailed by China National Intellectual Property Administration dated Dec. 3, 2020, which corresponds to Chinese Patent Application No. 201780088294.X and is related to U.S. Appl. No. 16/475,938; with English language translation.

International Search Report; Written Opinion; and Notification of Transmittal of the International Search Report and the Written Opinion of the International Searching Authority, or the Declaration issued in PCT/JP2017/010755; dated Jun. 6, 2017.

* cited by examiner

DEVICE FOR MANUFACTURING PLATE SOLDER AND METHOD FOR MANUFACTURING PLATE SOLDER

FIELD

The present invention relates to a device for manufacturing a plate solder and a method for manufacturing a plate solder.

BACKGROUND

PTL 1 discloses a method for manufacturing a ribbon solder. In this manufacturing method, a thin solder wire is rolled between a pair of rollers into a thin film ribbon shape.

CITATION LIST

Patent Literature

[PTL 1] JP 6-132645 A

SUMMARY

Technical Problem

In a manufacturing step of a semiconductor module, a joining material is fed onto a base material such as a substrate or a lead frame. Subsequently, a semiconductor chip is mounted on the joining material. Examples of the joining material include solder material and resin paste. The joining material is selected so as to meet chip specifications. In a manufacturing step of a power module, the solder material tends to be used in consideration of reliability, heat dissipation and cost reduction.

An example of a method of mounting a semiconductor chip using the solder material is a chip mounting scheme. In the chip mounting scheme, first, a semiconductor chip is mounted on solid solder at room temperature. Next, the solder and the semiconductor chip are joined by a reflow device. There is, otherwise, a technique of mounting a semiconductor chip after a base material is positioned on a heat source to melt solder.

The chip mounting scheme is suitable for manufacturing a large-current, high-voltage product in consideration of multi-chip mounting and stability of joining. In general, a ribbon solder is often used as the solder material in the chip mounting scheme. Note that ribbon solders are more expensive than thread solders. Therefore, it occasionally raises production costs. Moreover, when the ribbon solder is used, it needs to be selected to have a width and a thickness suitable for a portion where a semiconductor chip is mounted. Therefore, a plurality of kinds of ribbon solders need to be managed. Accordingly, management of solder materials is occasionally complex. Therefore, placing operation of a solder material is possibly mistakenly performed. Moreover, stock of those possibly increases.

How to reduce such production costs can be considered as manufacturing a ribbon solder using a thread solder, which is less expensive than a ribbon solder. Note that by the method disclosed in PTL 1, a thin film ribbon-shaped ribbon solder is formed from one thin solder wire. This occasionally makes increases in width and thickness of the ribbon solder difficult.

The present invention is devised in order to solve the aforementioned problems, and an object thereof is to obtain a device for manufacturing a plate solder and a method for manufacturing a plate solder by which device and method the shape can be easily changed.

Solution to Problem

A device for manufacturing a plate solder according to the present invention includes a reel on which a thread solder is wound; a cutter that cuts the thread solder, provided between the reel and an end part of the thread solder extending from the reel; an aggregating part that aggregates a plurality of cut thread solders such that the plurality of thread solders are in contact with one another; and a roller that rolls the plurality of aggregated thread solders and pressure bonds them to one another to form a plate solder.

A device for manufacturing a plate solder according to the present invention includes a housing part in which an opening that penetrates from a first face to a second face and houses a plurality of thread solders to be piled is provided; a press unit that is inserted into the opening from the first face side; a cutter that opens and closes perpendicularly to a direction of penetration of the opening, provided between the press unit and the second face; and a thickness adjusting part that adjusts a distance between the second face and the cutter, provided in the housing part, wherein the press unit presses the plurality of thread solders toward a press contact face provided on the second face side and perpendicularly to the direction of penetration of the opening to form a block solder, the cutter cuts the block solder housed in the opening to form a plate solder having a thickness according to a distance between the cutter and the press contact face, the cutter holds, in its closed state, a portion, of the cut block solder, that is on the press unit side between he cutter and the press unit, and the cutter is housed, in its opened state, outward of a region where the plurality of thread solders are provided.

A Method for manufacturing a plate solder according to the present invention includes a step of cutting a thread solder to form a plurality of thread solders; a step of aggregating the plurality of thread solders such that the plurality of thread solders are in contact with one another; and a step of rolling the plurality of aggregated thread solders and pressure bonding them to one another to form a plate solder.

A method for manufacturing a plate solder according to the present invention includes a step of housing a plurality of thread solders to be piled in an opening of a feed unit including: a housing part in which the opening which penetrates from a first face to a second face is provided; a press unit that is inserted into the opening from the first face side; a cutter that opens and closes perpendicularly to a direction of penetration of the opening, provided between the press unit and the second face; and a thickness adjusting part that adjusts a distance between the second face and the cutter, provided in the housing part; a step of positioning a press contact face on the second face side and perpendicularly to the direction of penetration of the opening; a step of pressing, by the press unit, the plurality of thread solders from the first face side toward the press contact face to form a block solder; and a step of closing the cutter in a state where the block solder is brought into contact with the press contact face to cut the block solder and to form a plate solder between the cutter and the press contact face, wherein the cutter holds, in its closed state, a portion, of the cut block solder, that is on the press unit side between the cutter and the press unit, and the cutter is housed, in its opened state, outward of a region where the plurality of thread solders are provided.

Advantageous Effects of Invention

With the device for manufacturing a plate solder according to the invention of the present application, the plurality of aggregated thread solders are pressure bonded to one another so as to be in contact with one another, and thereby, a plate solder is formed. Therefore, the width of the plate solder can be easily changed by changing the length of the thread solders.

With the device for manufacturing a plate solder according to the invention of the present application, the thickness of the plate solder can be adjusted by the thickness adjusting part. Therefore, the thickness of the plate solder can be easily changed.

With the method for manufacturing a plate solder according to the invention of the present application, the plurality of aggregated thread solders are pressure bonded to one another so as to be in contact with one another, and thereby, a plate solder is formed. Therefore, the width of the plate solder can be easily changed by changing the length of the thread solders, With the method for manufacturing a plate solder according to the invention of the present application, the thickness of the plate solder can be adjusted by the thickness adjusting part. Thereby, the thickness of the plate solder can be easily changed.

DESCRIPTION OF EMBODIMENTS

A according to an embodiment of the present invention are described with reference to drawings. Identical or corresponding constitutional elements are given the same reference numerals, and the repeated description of such constitutional elements may be omitted.

First Embodiment

Figure 1:
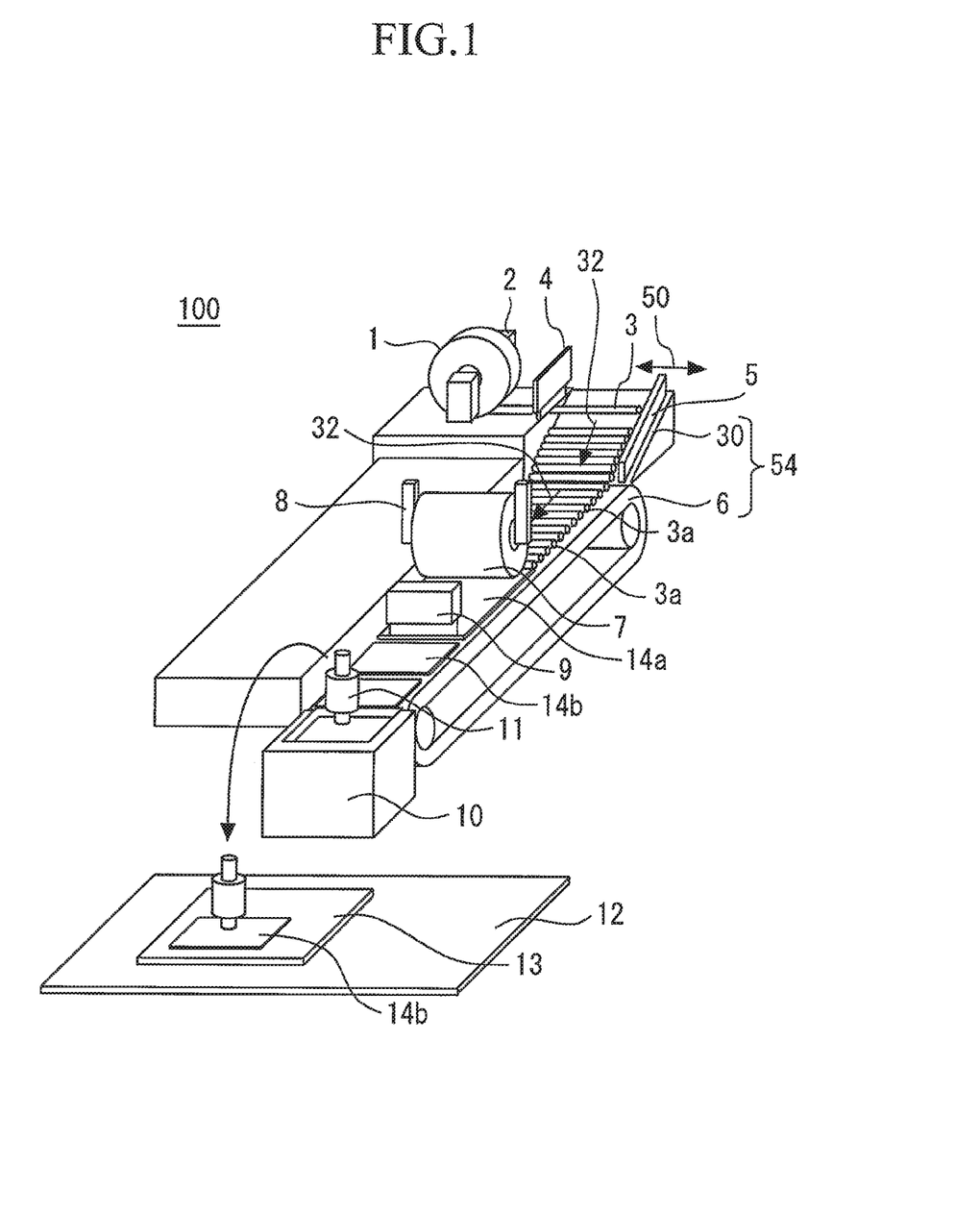
FIG. 1 is a perspective view of a device for manufacturing a plate solder according first embodiment.

FIG. 1 is a perspective view of a device 100 for manufacturing a plate solder according to a first embodiment. The manufacturing device 100 includes a reel 1. A thread solder 3 is wound on the reel 1. The reel 1 is attached to a rotary unit 2. The rotary unit 2 rotates the reel 1. The thread solder 3 drawn from the reel 1 travels straight in the direction of drawing. A first cutter 4 is provided between the reel 1 and the end part of the thread solder 3 extending from the reel 1. The first cutter 4 cuts the thread solder 3

The manufacturing device 100 includes an adjusting part 5 on the opposite side to the reel 1 relative to the first cutter 4. The adjusting part 5 can be moved in the direction indicated by an arrow 50. The thread solder 3 flows to a position at which its end part comes into contact with the adjusting part S. Therefore, the adjusting part 5 determines the distance between the first cutter 4 and the end part of the thread solder 3. Accordingly, by changing the position of the adjusting part 5, the length of the cut thread solder 3 can be changed.

A slope 30 is provided between the first cutter 4 and the adjusting part S. The slope 30 goes down from its one end to the other end. The thread solder 3 is drawn on the one end side of the slope 30. A conveyer 6 is provided at the other end of the slope 30. A roller 7 is provided above the conveyer 6. The roller 7 is attached to a rotary unit 8. The rotary unit 8 rotates the roller 7. Moreover, the rotary unit 8 moves the roller 7 in the direction perpendicular to the upper surface of the conveyer 6. Therefore, the rotary unit 8 adjusts the distance between the roller 7 and the conveyer 6.

The slope allows the end part side of the thread solder 3 cut by the first cutter 4 to go down toward the conveyer 6 and the roller 7. A cut thread solder 3a goes down along the slope 30 and is placed on the conveyer 6. The conveyer 6 transfers the thread solder 3a. Therefore, a plurality of thread solders 3a flow in the direction indicated by an arrow 32.

The plurality of cut thread solders 3a go down on the slope 30, and thereby, are aggregated together such that the plurality of thread solders 3a are in contact with one another. The plurality of thread solders 3a are aggregated without gaps therebetween such that the adjacent thread solders 3a are in contact with each other. In the present embodiment, the slope 30 and the conveyer 6 form an aggregating part 54 which aggregates the plurality of thread solders 3a.

The plurality of thread solders 3a are guided by the conveyer 6 to pass through under the roller 7. In this stage, the plurality of thread solders 3a are rolled by the roller 7. Here, the plurality of thread solders 3a are rolled in the state where they are aggregated so as to be in contact with one another, and thereby, are pressure bonded to one another. As a result, a plate solder 14a is formed from the plurality of thread solders 3a.

The manufacturing device 100 includes a second cutter 9. The second cutter 9 is provided above the conveyer 6. Moreover, the second cutter 9 is provided on the opposite side to the slope 30 relative to the roller 7. The second cutter 9 cuts the plate solder 14a to form a plate solder 14b.

A housing unit 10 is provided at the end part, of the conveyer 6, on the opposite side to the slope 30. The housing unit 10 houses cut plate solders 14b. The plate solders 14b are transferred by the conveyer 6 and housed in the housing unit 10. Moreover, the manufacturing device 100 includes a suction unit 11. The suction unit 11 sucks up the plate solder 14b. The plate solder 14b is sucked up by the suction unit 11 and is placed onto a product 13 provided on a transfer rail 12. The product 13 is, for example, semiconductor module product. The transfer rail 12 transfers the product 13.

Next, a method for manufacturing the plate solder 14b according to the present embodiment is described. First, the position of the adjusting part 5 is adjusted such that the distance between the first cutter 4 and the adjusting part 5 is the width of the plate solder 14b. Moreover, the rotary unit 8 is adjusted such that the distance between the roller 7 and the conveyer 6 equals to the thickness of the plate solder 14b that meets product specifications. Furthermore, the roller 7 is rotated.

Next, the reel 1 is rotated and the thread solder 3 is drawn. After that, the thread solder 3 is linearly drawn to the position where the end part of the thread solder 3 comes into contact with the lateral surface of the adjusting part 5. At the time point when the end part of the thread solder 3 comes into contact with the adjusting part 5, the thread solder 3 is cut by the first cutter 4. The cut thread solder 3 goes down on the slope 30. Next, the thread solder 3 is caused to flow again to the position where the end part of the thread solder 3 comes into contact with the lateral surface of the adjusting part 5. Cutting and flowing of the thread solder 3 are repeated afterward. Thereby, the plurality of thread solders 3a are formed.

By the plurality of thread solders 3a going down on the slope 30, they are aggregated on the slope 30 and on the conveyer 6 so as to be in contact with one another. The plurality of thread solders 3a are arranged consecutively in a raw. The plurality of aggregated thread solders 3a pass through on the rotating roller 7 therebeneath. In this stage, the thread solders 3a are rolled by the roller 7. As a result, the plurality of thread solders 3a are pressure bonded to one another to form the plate solder 14a.

The plate solder 14a is transferred by the conveyer 6 to reach the lower portion under the second cutter 9. Next, the plate solder 14a is cut by the second cutter 9. In this stage, the plate solder 14a is cut perpendicularly to the direction in which the plate solder 14a is drawn from the roller 7, The plate solder 14a is cut to have a length that meets the product specifications. The plate solder 14a is consecutively cut to have the length, which meets the product specifications.

The cut plate solders 14h are housed in the housing unit 10. Next, the plate solder 14b housed in the housing unit 10 is sucked up by the suction unit 11. Next, the suction unit 11 is moved to a solder placing part of the product 13 to place the plate solder 14b on the product 13.

In the present embodiment, by adjusting the length of cutting of the thread solder 3, the width of the plate solder 14b can be easily changed. Moreover, by adjusting the length of cutting of the plate solder 14a, the length of the plate solder 14h can be easily changed. Accordingly, the shape of the plate solder 14b can be easily changed. Furthermore, by adjusting the distance between the roller 7 and the conveyer 6, the thickness of the plate solder 14b can be changed. As above, in the present embodiment, the plate solders 14b with a size that meets the product specifications can be continuously manufactured.

Moreover, in the present embodiment, all the thread solder 3 drawn from the reel 1 can be molded into the plate solder 14a. Therefore, the thread solder 3 can be used without waste. Accordingly, production costs can be reduced. Moreover, since the plate solders 14b suitable for the product specifications can be manufactured from the thread solder 3, ribbon solders are not needed to be managed. Accordingly, management of solder materials can be simplified.

As a modification of the present embodiment, a plurality of reels 1 may be provided. In this case, the plurality of reels 1 line up to be perpendicular to the direction in which the thread solders 3 is drawn. The plurality of thread solders 3 which are wound individually on the plurality of reels 1 are drawn to be parallel to one another, and cut to have the same lengths by the first cutter 4. The plurality of cut thread solders 3a obtained from the plurality of thread solders 3 go down on the slope 30 and are molded into one plate solder 14a by the roller.

In the present embodiment, the aggregating part 54 includes the slope 30. The structure of the aggregating part 54 is not limited to this, but the plurality of thread solders 3a only have to be placed on the conveyer 6 in the state where they are aggregated continuously without gaps therebetween.

These modifications can be applied, as appropriate, to a device for manufacturing a plate solder and a method for manufacturing a plate solder according to the following embodiments. Note that the device for manufacturing the plate solder and the method for manufacturing the plate solder according to the following embodiments are similar to those of the first embodiment in many respects, and thus differences between the device for manufacturing the plate solder and the method for manufacturing the plate solder according to the following embodiments and those of the first embodiment will be mainly described below.

Second Embodiment

Figure 2:
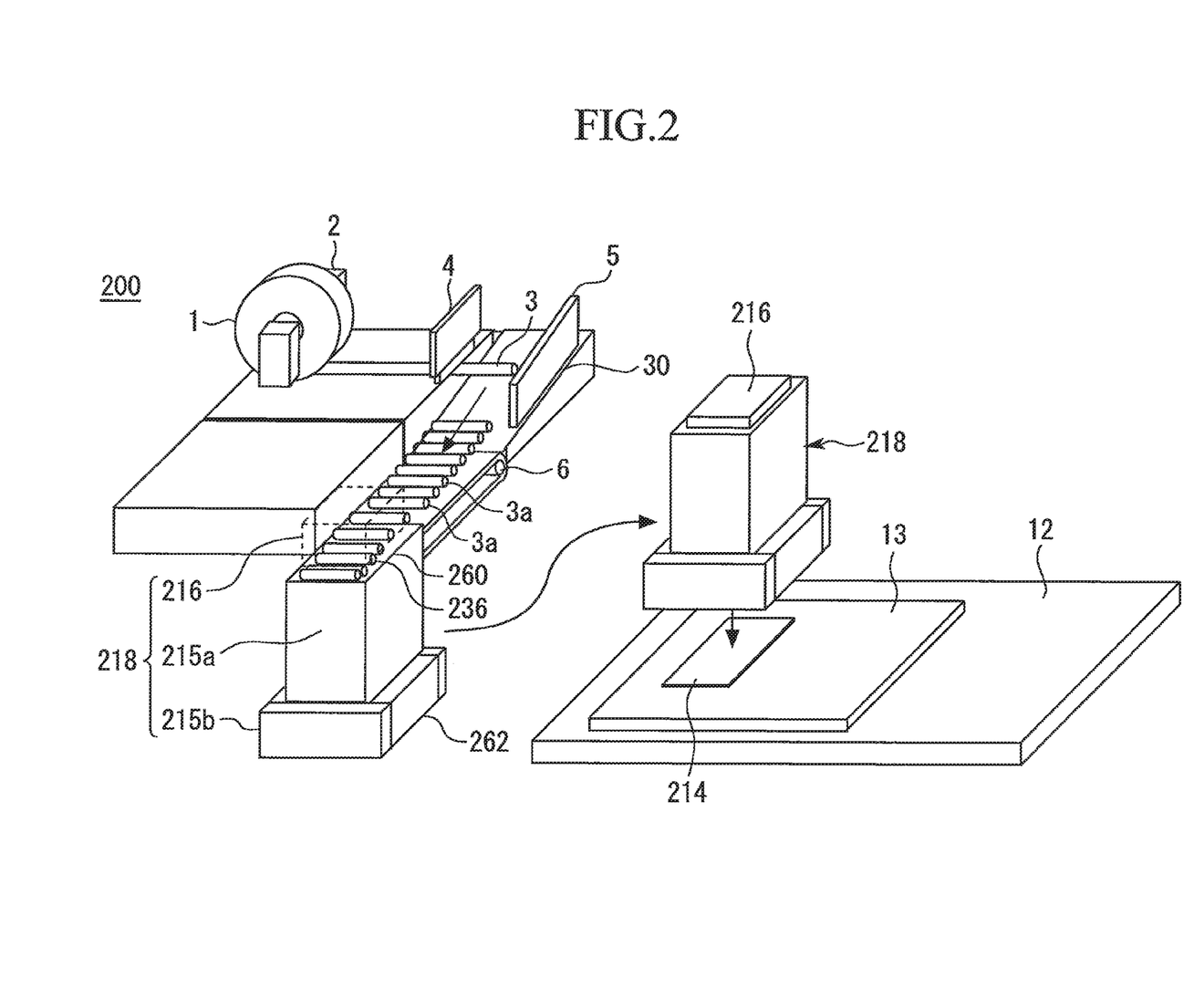
FIG. 2 is a perspective view of a device for manufacturing a plate solder according to a second embodiment.

FIG. 2 is a perspective view of a device 200 for manufacturing a plate solder according to a second embodiment. The manufacturing device 200 does not include the roller 7, the rotary unit 8, the housing unit 10 and the suction unit 11. Meanwhile, the manufacturing device 200 includes a feed unit 218. Its structure is otherwise similar to that of the first embodiment. The feed unit 218 molds a plate solder 214 from the thread solders 3a.

Figure 3:
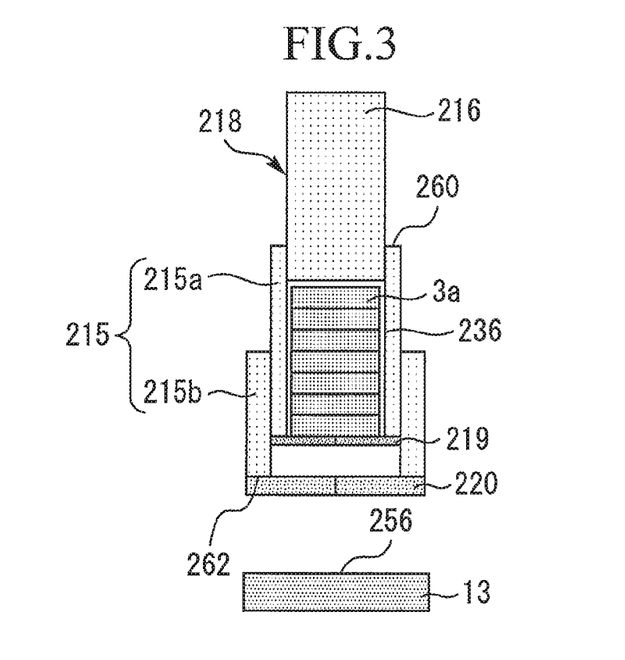
FIG. 3 is a cross-sectional view of the feed unit according to the second embodiment.

FIG. 3 is a cross-sectional view of the feed unit 218 according to the second embodiment. The feed unit 218 includes a housing part 215. An opening 236 is provided in the housing part 215 to penetrate from a first face 260 to a second face 262. The plurality of thread solders 3a are housed in the opening 236 to be piled. Moreover, the feed unit 218 includes a press unit 216. The press unit 216 is inserted into the opening 236 from the first face 260 side of the housing part 215. The press unit 216 presses the plurality of thread solders 3a.

Furthermore, the housing part 215 includes an upper housing part 215a and a thickness adjusting part 215b. The thickness adjusting part 215h is attached onto the upper housing part 215a so as to enclose an outer side of the upper housing part 215a. The lower end of the thickness adjusting part 215b is provided below the lower end of the upper housing part 215a. The thickness adjusting part 215b is driven upward and downward relative to the upper housing part 215a. In other words, the thickness adjusting part 215b moves in the direction of penetration of the opening 236 relative to the upper housing part 215a.

A stopper 220 is provided on the second face 262 of the housing part 215. The stopper 220 opens and closes perpendicularly to the direction of penetration of the opening 236. The stopper 220 is attached to the lower end of the thickness adjusting part 215b. The stopper 220 shuts the opening 236 in its closed state. Moreover, the stopper 220 is housed outward of the region where the plurality of thread solders 3a are provided in its opened state.

The feed unit 218 includes a third cutter 219. The third cutter 219 is provided between the press unit 216 and the second face 262 of the housing part 215. The third cutter 219 opens and closes perpendicularly to the direction of penetration of the opening 236. The third cutter is housed outward of the region where the plurality of thread solders 3a are provided in its opened state.

The third cutter 219 is attached to the lower end of the upper housing part 215a. The thickness adjusting part 215b moves upward and downward relative to the upper housing part 215a, and thereby, adjusts the distance between the second face 262 and the third cutter 219.

Next, a method for manufacturing the plate solder 214 according to the present embodiment is described. First, a housing step is performed. In the housing step, as illustrated in FIG. 3, the stopper 220 and the third cutter 219 are closed. Furthermore, the press unit 216 is removed from the housing part 215. As illustrated in FIG. 2, in this state, the feed unit 218 is positioned at the end part, of the conveyer 6, on the opposite side to the slope 30. Here, in FIG. 2, the stopper 220 is omitted for convenience.

Next, similarly to the first embodiment, the plurality of thread solders 3a are formed. The plurality of thread solders 3a are transferred by the conveyer 6 and housed in the opening 236 from the first face 260 side. In this stage, as illustrated in FIG. 2, the plurality of thread solders 3a are housed in a raw in plan view. Furthermore, as illustrated in FIG. 3, the plurality of thread solders 3a are housed to be piled in the direction of penetration of the opening 236. The plurality of thread solders 3a crowd in the opening 236.

Here, the third cutter 219 holds the plurality of thread solders 3a on the third cutter 219 in its closed state. Therefore, the plurality of thread solders 3a are arranged on the third cutter 219. While in the present embodiment, the plurality of thread solders 3a are housed in the opening 236 in the closed state of the third cutter 219, the plurality of thread solders 3a may be housed in the opening 236 in the opened state of the third cutter 219. In this case, the plurality of thread solders 3a are arranged on the stopper 220.

Figure 4:
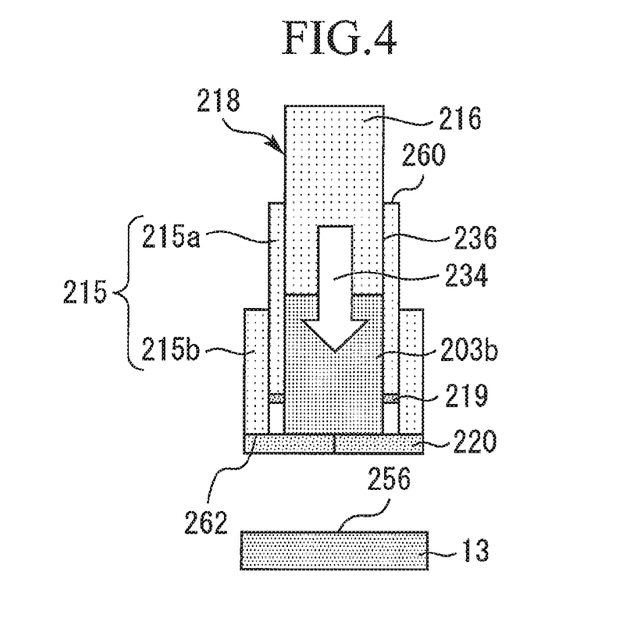
FIG. 4 is a diagram for explaining the pressing step according to the second embodiment.

Next, a pressing step is performed. FIG. 4 is a diagram for explaining the pressing step according to the second embodiment. In the pressing step, first, the third cutter 219 is opened. Next, the press unit 216 is inserted into the opening 236 from the first face 260 side. Next, as indicated by an arrow 234, the plurality of thread solders 3a are pressed by the press unit 216 from the first face 260 side toward the stopper 220. Thereby, the stopper 220 and the plurality of thread solders 3a come into contact with each other. Furthermore, the press unit 216 presses the plurality of thread solders 3a between the stopper 220 and the press unit 216 in the state where the plurality of thread solders 3a and the stopper 220 are in contact with each other. As a result, the plurality of thread solders 3a are integrated to form a block solder 203b.

In the present embodiment, the upper face of the stopper 220 is regarded as a press contact face for pressure bonding the plurality of thread solders 3a to one another between itself and the press unit 216. In the present embodiment, the press contact face is formed by closing the stopper 220. The press contact face is provided perpendicularly to the direction of penetration of the opening 236 on the second face 262 side. The plurality of thread solders 3a are pressed between the press unit 216 and the press contact face to be integrated.

Figure 5:
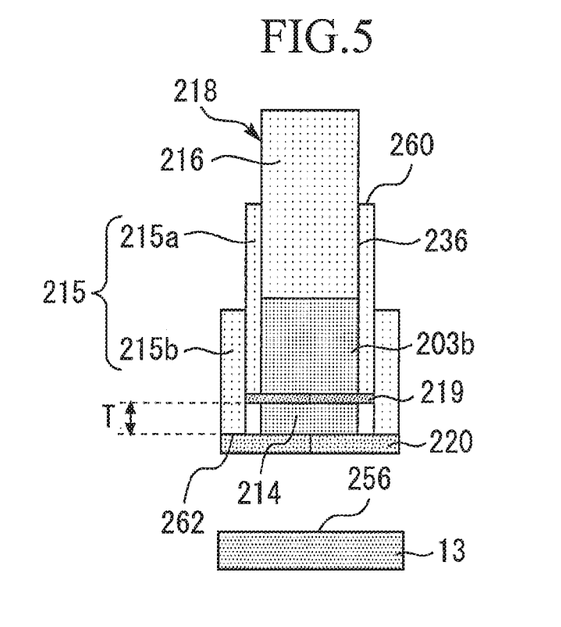
FIG. 5 is a diagram for explaining the cutting step according to the second embodiment.

Next, a cutting step is performed. FIG. 5 is a diagram for explaining the cutting step according to the second embodiment. In the cutting step, the third cutter 219 is closed in the state where the stopper 220 and the block solder 203b are in contact with each other. Thereby, the third cutter 219 cuts the block solder 203b housed in the opening 236. As a result, the plate solder 214 is formed between the third cutter 219 and the stopper 220. As shown in FIG. 5, the plate solder 214 is formed to have a thickness according to a distance T between the upper face, of the stopper 220, which is the press contact face and the third cutter 219.

Figure 6:
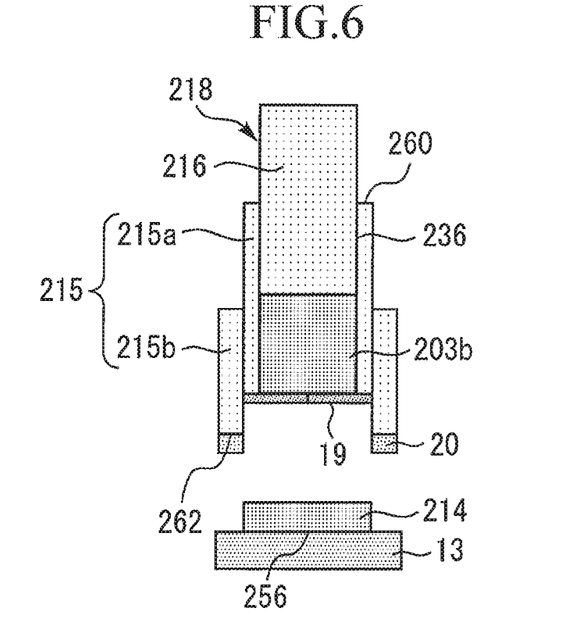
FIG. 6 is a diagram for explaining the placing step according to the second embodiment.

Next, a placing step is performed.. FIG. 6 is a diagram for explaining the placing step according to the second embodiment. In the placing step, the stopper 220 is opened over a solder placing part 256 of the product 13 in the closed state of the third cutter 219. Here, the solder placing part 256 is a region, of the product 13, for placing the plate solder 214 thereon.

The solder placing part 256 is, for example, a region which is provided on a base material such as a substrate or a lead frame and is for joining a semiconductor chip thereonto.

As a result, the plate solder 214 is placed on the solder placing part 256. Here, the third cutter 219 holds a portion, of the cut block solder 203b, that is on the press unit 216 side on the third cutter 219 in its closed state. Therefore, even if the stopper 220 opens, the portion, of the cut block solder 203b, which is on the press unit 216 side is held between the third cutter 219 and the press unit 216.

In the present embodiment, the distance between the second face 262 on which the stopper 220 is provided and the third cutter 219 is the thickness of the plate solder 214. The distance between the second face 262 and the third cutter 219 is adjusted by the thickness adjusting part 215b. Accordingly, with the present embodiment, the thickness of the ate solder 214 can be easily changed. With the present embodiment, the thickness of the plate solder 214 can be determined regardless of the diameter of the thread solder 3. Accordingly, flexibility of selection of the thread solder 3 can be improved.

Moreover, by adjusting the length of the thread solders 3a housed in the opening 236, the width of the plate solder 214 can be changed. Furthermore, by adjusting the number of thread solders 3a arranged in the opening 236 in plan view, the length of the plate solder 214 can be changed. Accordingly, with the present embodiment, the shape of the plate solder 214 can be easily changed.

Furthermore, by pressing and pressure bonding the plurality of thread solders 3a, the thread solders 3a can be strongly pressure bonded together in the plate solder 214. Therefore, the thread solders 3a can be prevented from separating from the plate solder 214.

Moreover, with the present embodiment, the plate solder 214 can be directly fed onto the product 13 from the feed unit 218. Therefore, it is not needed to use the suction unit 11. described for the first embodiment to place the plate solder 214 onto the product 13. Accordingly, with the present embodiment, the suction unit 11 and the plate solder 214 do not separate from each other when the plate solder 214 is placed. Therefore, the plate solders 214 can be stably placed onto the products 13.

Moreover, with the present embodiment, the plurality of thread solders 3a do not need to be aggregated without gaps therebetween on the conveyer 6. Therefore, the slope 30 is not necessarily provided. In this case, the thread solder 3 is cut on or above the conveyer 6 to be transferred to the housing part 215.

In the present embodiment, the third cutter 219 includes two blades. The two blades close from both sides of the opening 236 toward the center of the opening 236 in a direction perpendicular to the direction of penetration of the opening 236. As a modification of this, the third cutter 219 may include a sole blade. In this case, the sole blade closes from one end of the opening 236 toward the other end in a direction perpendicular to the direction of penetration of the opening 236, and thereby, the block solder 203h is cut. Moreover, the third cutter 219 may include three or more blades.

Moreover, in the present embodiment, the stopper 220 includes two plates. The two plates close from both sides of the opening 236 toward the center of the opening 236 in a direction perpendicular to the direction of penetration of the opening 236. The structure of the stopper 220 is not limited to this but it is sufficient that in its closed state, it shuts the opening 236 and that in its opened state, it is housed outward of the region where the plurality of thread solders 3a are provided. For example, the stopper 220 may include a sole plate. In this ease, the sole plate closes from one end of the opening 236 toward the other end in a direction perpendicular to the direction of penetration of the opening 236.

Third Embodiment

Figure 7:
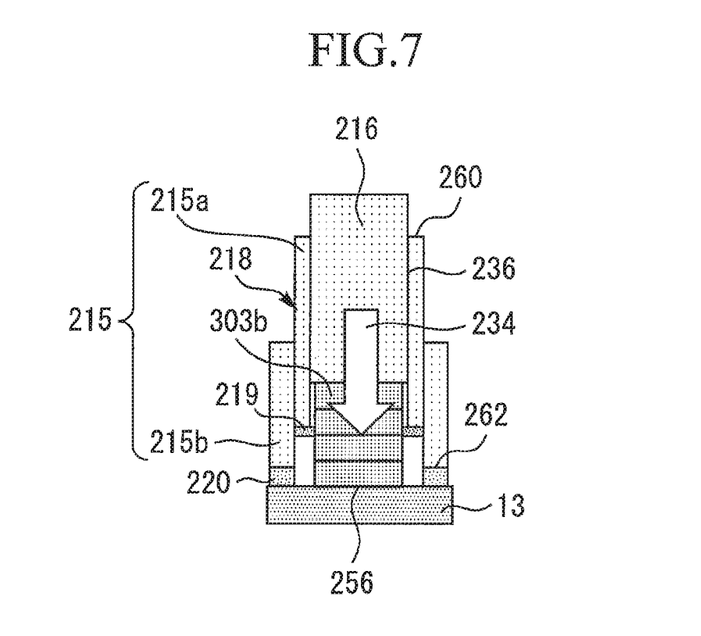
FIG. 7 is a diagram for explaining the pressing step according to a third embodiment.

FIGS. 7 to 10 are diagrams for explaining a method for manufacturing a plate solder according to a third embodiment. A housing step according to the present embodiment is similar to that of the second embodiment. Next, a pressing step according to the present embodiment is performed. FIG. 7 is a diagram for explaining the pressing step according to the third embodiment. First, in the state where the plurality of thread solders 3a are held on the third cutter 219, the stopper 220 is opened. Next, the feed unit 218 is positioned onto the product 13 such that the plurality of thread solders 3a are positioned over the solder placing part 256. In this stage, the rear face of the stopper 220 is in contact with the upper surface of the product 13.

Next, the third cutter 219 is opened. Next, the press unit 216 is inserted from the first face 260 side, and as indicated by an arrow 234, the plurality of thread solders 3a are pressed toward the solder placing part 256. As a result, the plurality of thread solders 3a are pushed out by the press unit 216 to be placed on the solder placing part 256. Thereby, the block solder 303b in which the plurality of thread solders 3a crowd is formed on the solder placing part 256. Here, the plurality of thread solders 3a only have to crowd in the block solder 303b and do not need to be completely integrated.

Figure 8:
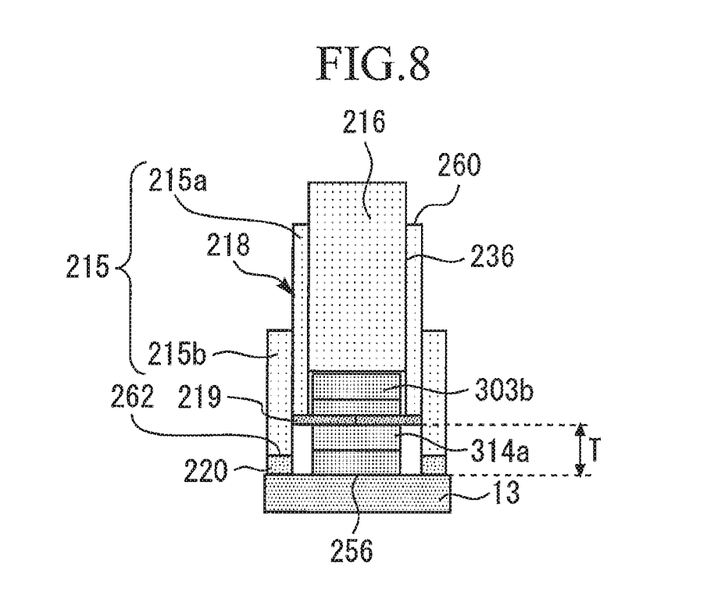
FIG. 8 is a diagram for explaining the cutting step of according to the third embodiment.

Next, a cutting step is performed. FIG. 8 is a diagram for explaining the cutting step of according to the third embodiment. In the cutting step, the third cutter 219 is closed in the state where the solder placing part 256 and the block solder 303b are in contact with each other. Thereby, the third cutter 219 cuts the block solder 303h housed in the opening 236. As a result, a plate solder 314a is formed between the third cutter 219 and the solder placing part 256. The plate solder 314a is placed on the solder placing part 256. As shown in FIG. 8, the plate solder 314a is formed to have a thickness according to the distance T between the solder placing part 256 and the third cutter 219.

Figure 9:
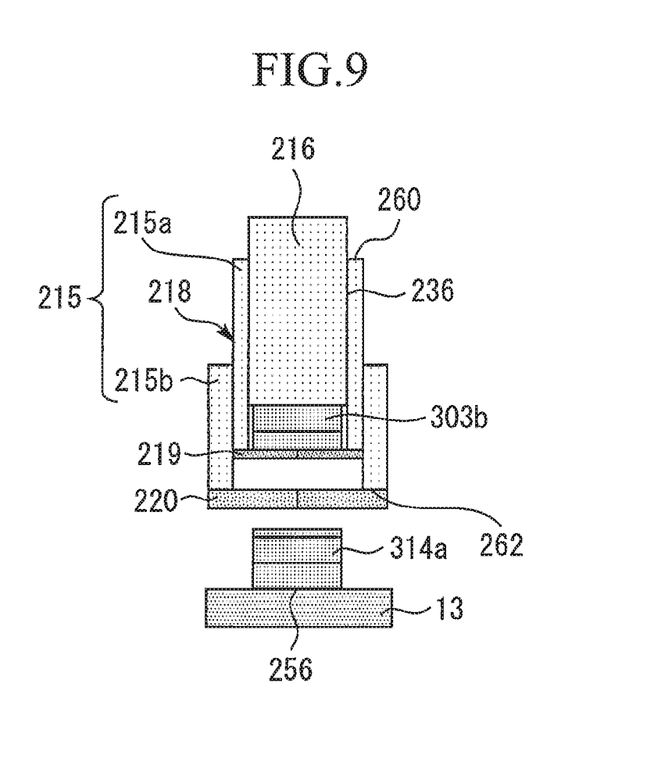
FIG. 9 is a diagram for explaining the state where the feed unit is moved upward over the plate solder.

Next, the feed unit 218 is moved upward over the plate solder 314a in the state where the third cutter 219 is closed and the plate solder 314a is placed on the solder placing part 256. FIG. 9 is a diagram for explaining the state where the feed unit 218 is moved upward over the plate solder 314a. Next, the stopper 220 is closed.

Figure 10:
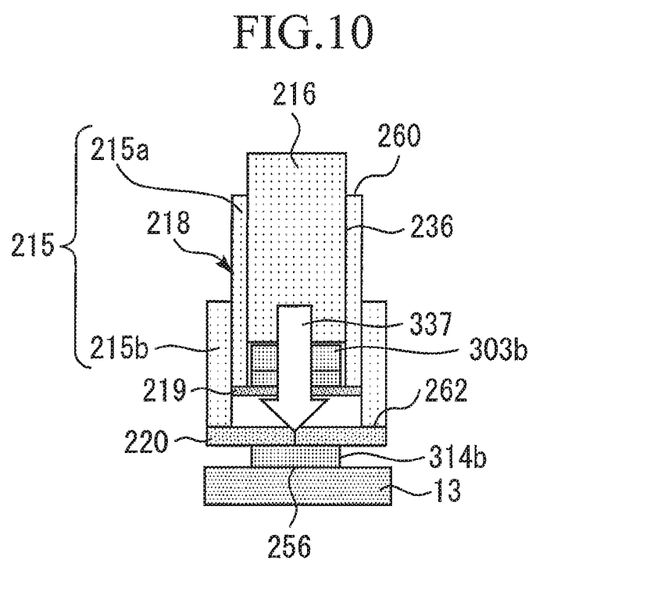
FIG. 10 is a diagram for explaining the state where the plate solder is pressed.

Next, in the state where the stopper 220 is closed, the plate solder 314a is pressed from the upper portion on the plate solder 314a. by the stopper 220. FIG. 10 is a diagram for explaining the state where the plate solder 314a is pressed. The plate solder 314a is pressed in the direction indicated by an arrow 337 by the stopper 220. By being pressed by the stopper 220, the plurality of thread solders 3a are integrated in the plate solder 314a to form a plate solder 314b.

In the present embodiment, the solder placing part 256 is regarded as a press contact face for pressure bonding the plurality of thread solders 3a to one another between itself and the stopper 220. In the present embodiment, in the pressing step, the feed unit 218 is positioned over the product 13 in the opened state of the stopper 220, and thereby, the press contact face is formed.

The thickness of the plate solder 314b is smaller than the thickness of the plate solder 314a. In the present embodiment, the thickness of the plate solder 314b is determined based on the strength of pressing the plate solder 314a by the stopper 220. Accordingly, in the present embodiment, the thickness of the plate solder 314b can be changed by adjusting the conditions of pressing. As a modification of this, the thickness of the plate solder 314b may be determined based on the minimum value of the distance between the stopper 220 and the solder placing part 256 in the step of pressing the plate solder 314a by the stopper 220.

In the present embodiment, the plate solder 314a is further pressed after the plate solder 314a is fed onto the solder placing part 256. By pressing the plate solder 314a on the product 13, close contact between the product 13 and the plate solder 314b can be enhanced. Accordingly, the plate solder 314h can be prevented from being positionally displaced during transfer of the product 13. Therefore, a solder fixing jig for preventing such positional displacement does not need to be provided. Accordingly, production costs can be reduced.

As a modification of the present embodiment:, in the pressing step illustrated in FIG. 7, the plurality of thread solders 3a may be pressed so as to be integrated. In this case, in the pressing step, the plurality of thread solders 3a are pressed between the press unit 216 and the solder placing part 256 to form the block solder 303b that is integrated. Cutting this block solder affords the integrated plate solder 314b. In this case, there is not needed the step of pressing the plate solder 314a by the stopper 220 illustrate in FIG. 10. Moreover, in this case, the feed unit 218 does not need to include the stopper 220.

Figure 11:
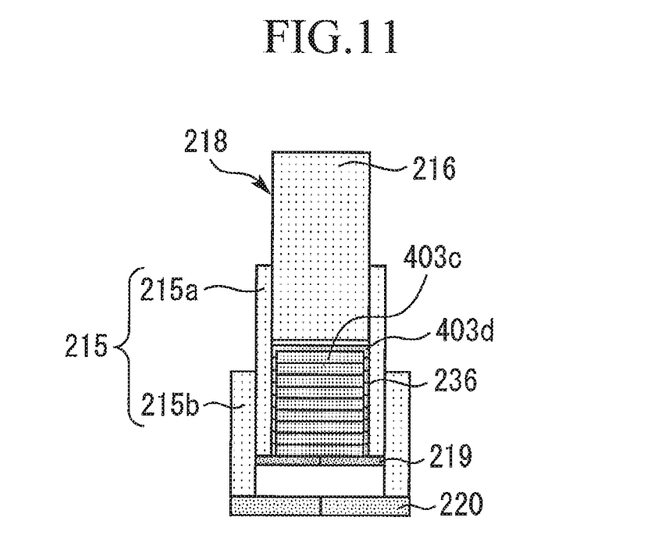
FIG. 11 is a diagram for explaining a method for manufacturing a plate solder according to a modification of the third embodiment.

FIG. 11 is a diagram for explaining a method for manufacturing a plate solder according to a modification of the third embodiment. In the third embodiment, in the housing step, the plurality of thread solders 3a with the same shapes are housed in the opening 236. On the contrary, in the housing step, a plurality of thread solders 403c and 403d with different shapes may be housed in the opening 236. The thread solders 403e illustrated in FIG. 11 are smaller in diameter than the thread solders 403d therein. Moreover, the thread solders 403c are shorter than the thread solders 403d.

By housing the plurality of thread solders 403c and 403d with different lengths and diameters in the opening 236, a filling rate in the opening 236 can be increased. For example, there can be filled with the thread solders 403d gaps between the thread solders 403c and gaps between the thread solders 403c and the lateral surface of the housing part 215, the gaps arising in the state where the plurality of thread solders 403c are housed in the opening 236. Thereby, close contact between the thread solders can be enhanced in pressing.

Therefore, the thread solders 403c and 403d can be prevented from separating from the plate solder during placing or product transfer.

In this modification, the plurality of thread solders 403c and 403d are different in length and diameter from each other. On the contrary, the plurality of thread solders 403c and 403d may be different in length or diameter.

Fourth Embodiment

Figure 12:
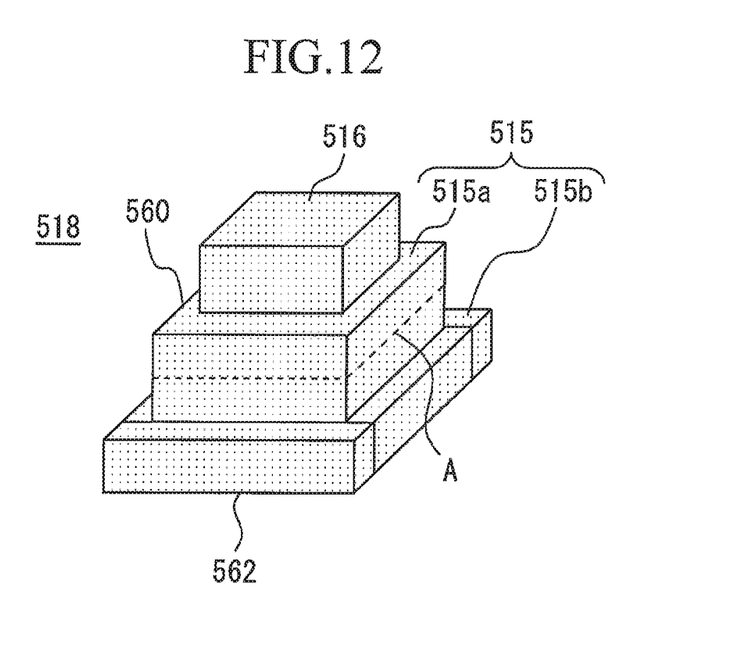
FIG. 12 is a perspective view of a feed unit according to a fourth embodiment.

FIG. 12 is a perspective view of a feed unit 518 according to a fourth embodiment. The feed unit 518 includes a housing part 515 and a press unit 516. The housing part 515 includes an upper housing part 515a and a thickness adjusting part 515b. Notably, in FIG. 12, the stopper 220 is omitted for convenience.

Figure 13:
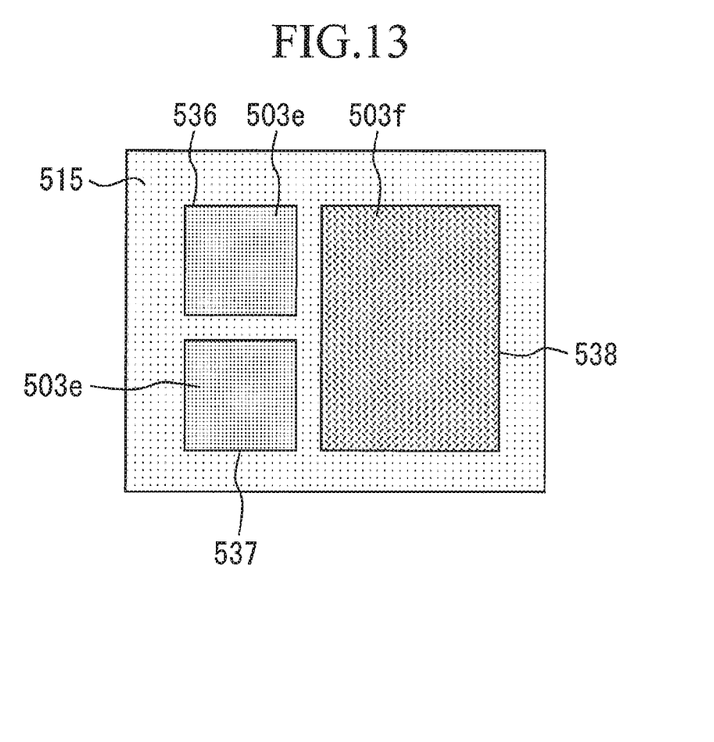
FIG. 13 is a cross-sectional view taken along the broken line A in FIG. 12.

FIG. 13 is a cross-sectional view taken along the broken line A in FIG. 12. A plurality of openings 536, 537 and 538 are provided in the housing part 515 to penetrate from a first face 560 to a second face 562. The openings 536 and 537 are different in shape in plan view from the opening 538. Moreover, the opening 538 is larger in area than the openings 536 and 537.

Moreover, in the present embodiment, a plurality of thread solders 503e are housed in the openings 536 and 537. Moreover, a plurality of thread solders 503f are housed in the opening 538. The thread solders 503e are shorter than the thread solders 503f. In a method for manufacturing a plate solder according to the present embodiment, the plurality of thread solders 503e and 503f different in length from each other are housed in the openings 536, 537 and 538.

Moreover, the thread solders 503e and the thread solders 503f are different in material from each other. In the method for manufacturing a plate solder according to the present embodiment, the plurality of thread solders 503e and 503f different in material from each other are housed in the openings 536, 537 and 538.

With the present embodiment, the openings 536, 537, 538 in a plurality of shapes are provided in the housing part 515, and thereby, an opening to be used can be selected to meet product specifications. Thereby, one feed unit 518 can form plate solders with a plurality of areas. Moreover, by using the feed unit 518 when the product 13 has a plurality of solder placing parts 256, a plurality of plate solders can be collectively placed thereon. Moreover, when a plurality of plate solders corresponding to small product sizes, by way of example, are produced, such a plurality of plate solders can be collectively manufactured. Accordingly, a processing time for products can be reduced.

Moreover, the plurality of thread solders 503e and 503f different in material from each other are housed in the plurality of openings 536, 537 and 538, and thereby, a thread solder of the material suitable for product specifications can be selected to form a plate solder.

While in the present embodiment, the three openings 536, 537 and 538 are formed in the housing part 515, the number of opening only has to be plural. Moreover, the shapes of the openings 536, 537 and 538 are not limited to those illustrated in FIG. 13. Moreover, in the present embodiment, one press unit 516 is included for the three openings 536, 537 and 538. On the contrary, press units 516 may be provided individually for the openings 536, 537 and 538.

Figure 14:
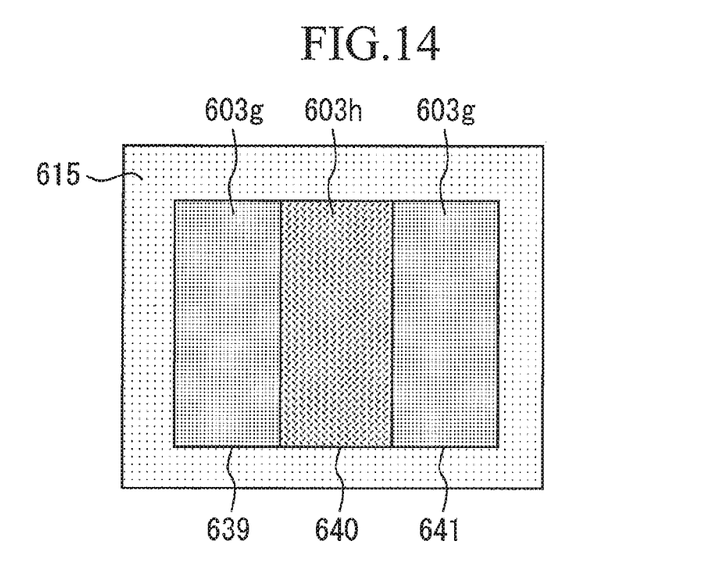
FIG. 14 is a cross-sectional view of a housing part according to a modification of the fourth embodiment.

FIG. 14 is a cross-sectional view of a housing part 615 according to a modification of the fourth embodiment. FIG. 14 is a cross-sectional view, of an upper housing part according to the modification, taken along a plane parallel to the second face. In the present embodiment, a plurality of openings 639, 640 and 641 are provided in the housing part 615. The openings 639, 640 and 641 are equal in shape in plan view to one another. The openings 639, 640 and 641 are provided to be adjacent to one another. Moreover, the openings 639, 640 and 641 are provided to line up along the lateral surface of the housing part 615.

A plurality of thread solders 603g are housed in the opening 639 and the opening 641. A plurality of thread solders 603h are provided in the opening 640 provided between the opening 639 and the opening 641. The thread solder 603g and the thread solder 603h are different in material from each other.

The thread solders 603g and 603h different in material are housed in the plurality of openings 639, 640 and 641 adjacent to one another, and thereby, plate solders different in material can be placed to line up on the solder placing part 256. Therefore, the plate solders formed of a plurality of kinds of solder materials can be formed on the solder placing part 256. Thereby, plate solders formed of materials suitable for product specifications can be produced.

In this modification, for example, the thread solders 603g that have high melting point are housed in the outside openings 639 and 641, and the thread solders 603h that have low melting point are housed in the inside opening 640. Thereby, on the solder placing part 256, a plate solder can be formed which has a higher melting point in a more outward portion of itself. Therefore, external stress can be relieved at the bonding surface between the plate solder and a product. Accordingly, the service life of the product can be elongated.

In this modification, the kinds of the thread solders are made different from one another individually for the openings. On the contrary, the thread solders 603g and 603h of different kinds may be housed in one opening. Note that the technical features described in the above embodiments may be combined as appropriate.

REFERENCE SIGNS LIST 100,200 manufacturing device, 3,3a,403c,403d,503e,503f, 603g,603h thread solders, 14a,14b,214,314a,314b plate solder, 203b,303b block solder, 1 reel, 4 first cutter, 9 second cutter, 219 third cutter, 54 aggregating part, 7 roller, 30 slope, 260 first face, 262 second face, 236,536,537,538,639, 640,641 opening, 216 press unit, 215b thickness adjusting part, 220 stopper, 256 solder placing part

The invention claimed is:

1. A method for manufacturing a plate solder, comprising:
a step of housing a plurality of thread solders to be piled in an opening of a feed unit including: a housing part in which the opening which penetrates from a first face to a second face is provided; a press unit that is inserted into the opening from the first face side; a cutter that opens and closes perpendicularly to a direction of penetration of the opening, provided between the press unit and the second face; and a thickness adjusting part that adjusts a distance between the second face and the cutter, provided in the housing part;
a step of positioning a press contact face on the second face side and perpendicularly to the direction of penetration of the opening;
a step of pressing, by the press unit, the plurality of thread solders from the first face side toward the press contact face to form a block solder; and
a step of closing the cutter in a state where the block solder is brought into contact with the press contact face to cut the block solder and to form a plate solder between the cutter and the press contact face, wherein the cutter holds, in its closed state, a portion, of the cut block solder, that is on the press unit side between the cutter and the press unit, and the cutter is housed, in its opened state, outward of a region where the plurality of thread solders are provided.

2. The method for for manufacturing a plate solder according to claim 1, wherein p1 the feed unit further includes a stopper that opens and closes perpendicularly to the direction of penetration of the opening and is provided on the second face, the stopper shuts, in its closed state, the opening and is housed, in its opened state, outward of the region where the plurality of thread solders are provided, and the press contact face is formed by the stopper being closed, the method comprising a step of opening, in the closed state of the cutter, the stopper over a solder placing part to place the plate solder on the solder placing part.

3. hod for manufacturing a plate solder according to claim 1, wherein the press contact face is a solder placing part for placing the plate solder.

4. hod for manufacturing a plate solder according to claim 1, wherein the feed unit further includes a stopper that opens and closes perpendicularly to the direction of penetration of the opening and is provided on the second face, and the stopper shuts, in its closed state, the opening and is housed, in its opened state, outward of the region where the plurality of thread solders are provided, the method comprising:

a step of moving the feed unit to an upper portion over the plate solder in a state where the cutter is closed and the plate solder is placed on a solder placing part; and a step of pressing, by the stopper, the plate solder from the upper portion on the plate solder in the closed state of the stopper.

5. hod for manufacturing a plate solder according to claim 1, wherein a plurality of thread solders different in shape are housed in the opening.

6. hod for manufacturing a plate solder according to claim 1, wherein a plurality of thread solders different in material are housed in the opening.

\* \* \* \* \*